June 30, 1953  J. P. STEIBEL  2,643,555
SELF-CONTAINED POWER UNIT
Filed Jan. 12, 1950  4 Sheets-Sheet 4
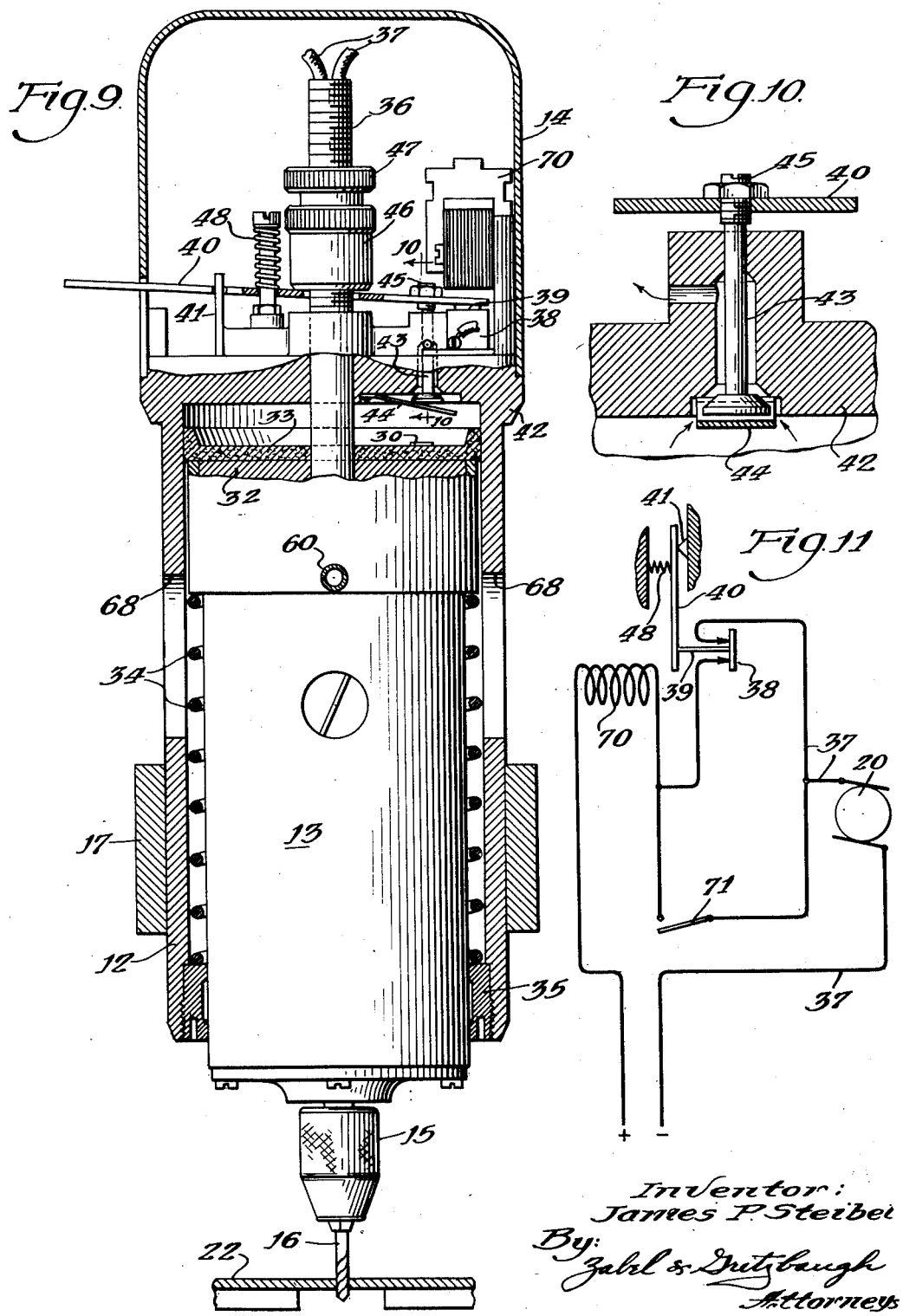
Inventor:
James P. Steibel
By: Zahl & Gritzbaugh
Attorneys Patented June 30, 1953

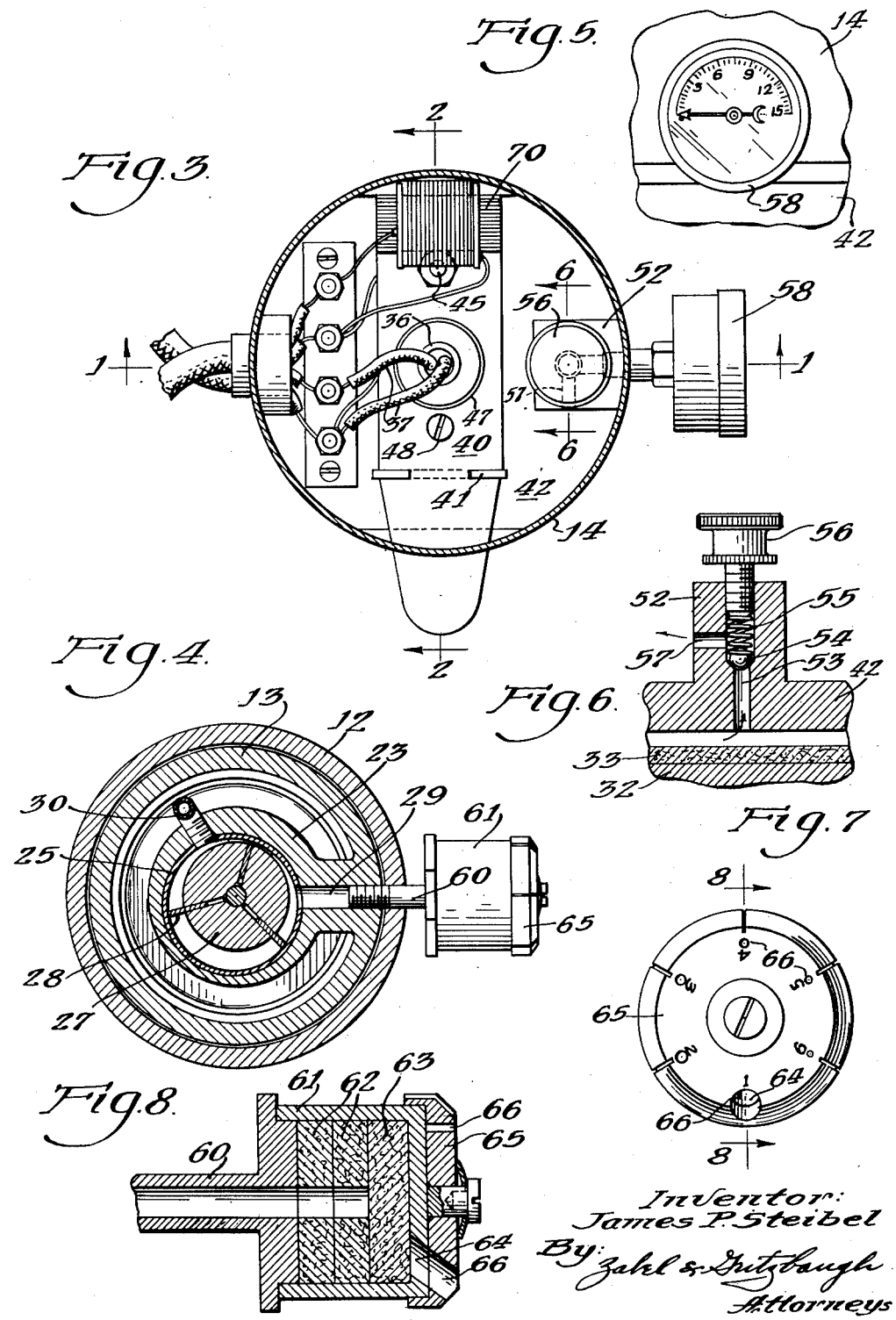

2,643,555

UNITED STATES PATENT OFFICE 2,643,555

SELF-CONTAINED POWER UNIT

James P. Steibel, Racine, Wis., assignor to The Dumore Company, Racine, Wis., a corporation of Wisconsin Application January 12, 1950, Serial No. 138,083

20 Claims. (Cl. 77—6)

This invention relates to an improved power unit for a tool, such as a drill, which is to be advanced or fed into the work.

It is an object of this invention to provide a self-contained power unit which can be mounted on any suitable supporting means, and at any angle, and which is semi-automatic in its operation. There is thus provided a tool power unit which is extremely flexible in its adaptability for various uses. For instance, a plurality of such power units can be mounted on a jig and can be provided with a common control, but each power unit can be regulated in accordance with the particular type of work which is to be performed by it.

It is a further object to provide a self-contained power unit having feeding means which can be regulated as to the extent of feed, the working force and rate of feed.

In the usual power unit for a drill or other tool, just the tool spindle is axially displaceable, the power means, such as the motor, being mounted on the supporting means. This arrangement requires a splined connection between the power means and the spindle. In the present invention, the power means is axially displaceable with the tool spindle, thereby contributing to a less costly and more compact construction.

The objects of the present invention are attained, in part, by providing a power unit in the form of a cylinder and piston, the motor and tool spindle being carried by the piston. Means are provided for forcing air into the cylinder to urge the tool spindle toward the work. By utilizing a pneumatic feed, I am enabled to control the working force, or axial thrust on the spindle as well as the rate of advance.

A further object is to provide a power unit having a pneumatic feed which embodies its own air compressor, thereby dispensing with the necessity for an outside source of compressed air.

Still another object is to provide a power unit for a tool in which the compressor serves as a floating pre-load on the motor thereby preventing tool damage which often occurs when the tool is brought into engagement with the work at excessive speed.

Other objects, features and advantages will become apparent as the description proceeds.

With reference now to the drawings in which like reference numerals designate like parts:

Fig. 3 is a transverse section taken along line 3—3 of Fig. 1;

Fig. 4 is a transverse section taken along line 4—4 of Fig. 1;

Fig. 5 is a fragmentary elevation showing the pressure gauge;

Fig. 6 is a vertical section taken along line 6—6 of Fig. 3;

Fig. 7 is an elevation of the speed control disk;

Fig. 8 is a section taken along line 8—8 of Fig. 7;

Fig. 9 is a section similar to Fig. 2, but showing the parts in a changed position;

Fig. 10 is an enlarged detailed view taken along line 10—10 of Fig. 9, and

Fig. 11 is a wiring diagram.

Figure 1:
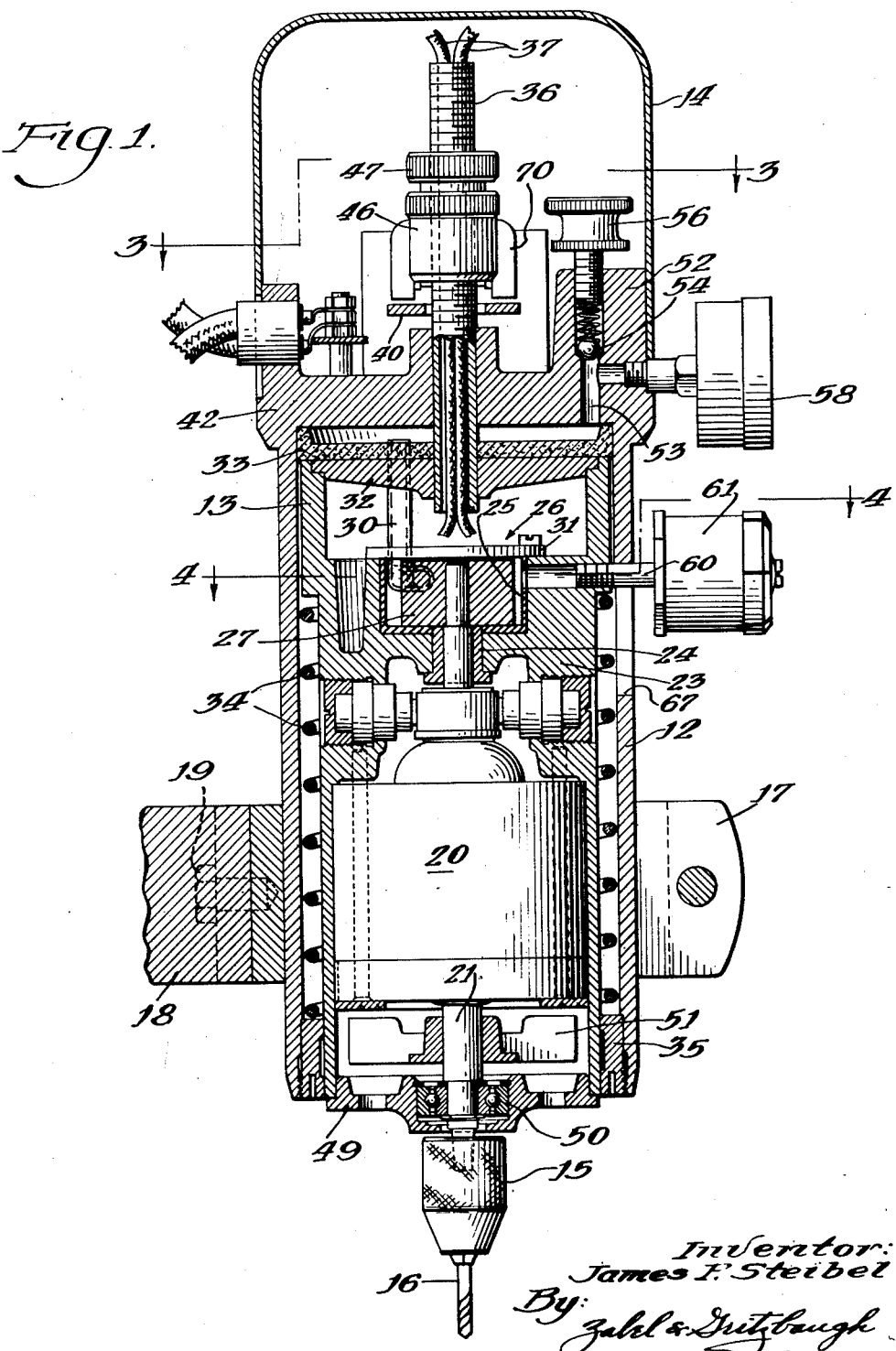
Fig. 1 is an axial section of a preferred embodiment of this invention taken along line 1—1 of Fig. 3.

The power unit comprises generally a cylinder 12 and a piston 13. A shell 14 is disposed over the cylinder head and encloses certain parts. A chuck 15 is carried by the piston in which may be mounted a drill 16 or other tool. The power unit as a whole is mounted by means of a clamp 17 which engages the cylinder and which in turn may be secured to suitable supporting means 18 by means of screws 19.

Figure 2:
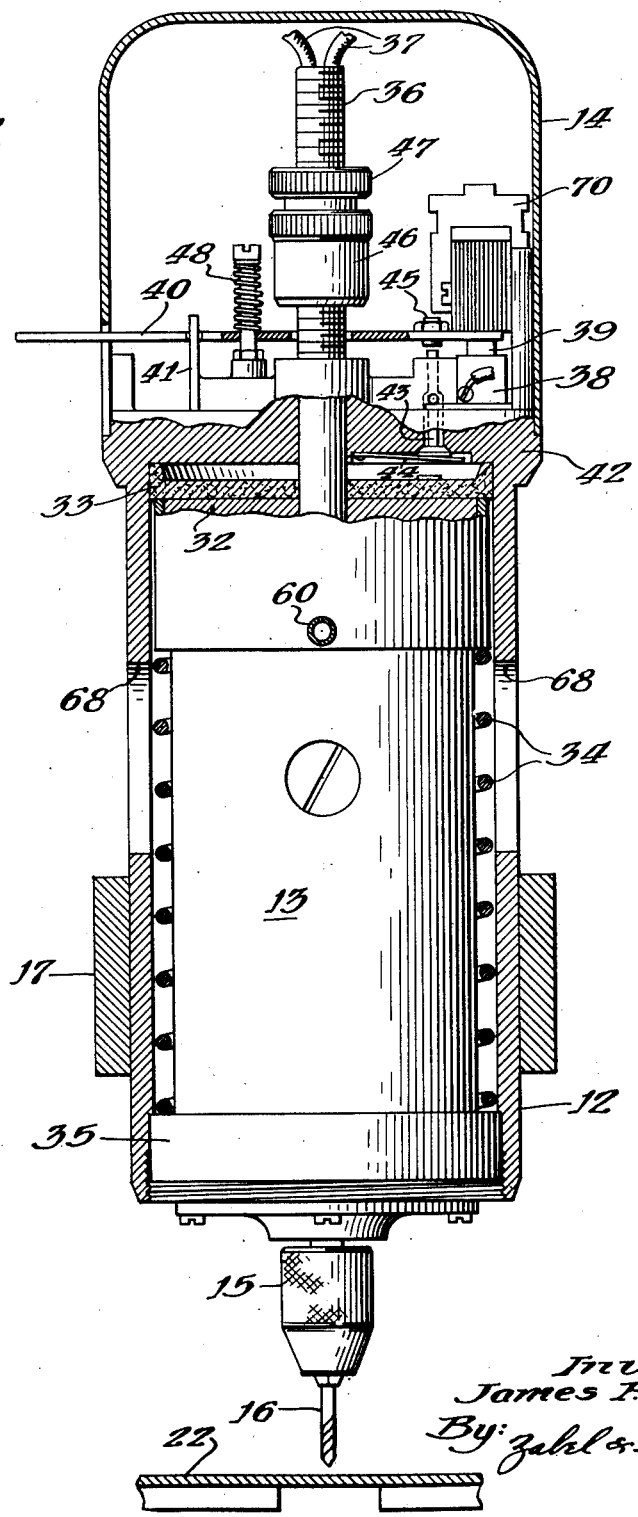
Fig. 2 is an axial section taken along line 2—2 of Fig. 3.

Mounted in the piston 13 and forming a part thereof is an electric motor 20 and a compressor 26, driven by the electric motor which forces air into the cylinder to apply the necessary axial thrust. The electric motor includes an armature shaft 21 which constitutes the tool spindle to which the chuck 15 is secured. Figs. 2 and 9 illustrate the manner in which the piston and tool are moved downwardly or outwardly into engagement with the work 22.

The piston 13 is in the form of a cylindrical member having hollowed out upper and lower portions and an intermediate body portion 23. The motor 20 is disposed in the lower hollowed out portion, and need not be specifically described since it may be of a standard type, the piston walls serving as a motor housing. The body portion 23 supports a bearing 24 for the armature shaft 21. The upper part of the body portion is provided with an eccentric cylindrical recess in which is disposed a suitable liner 25 which forms a part of the compressor 26. The compressor is of the rotary vane type and also includes a rotor 27 which is secured to the upper end of the armature shaft 21 against relative rotation with respect thereto. A keyed connection is preferred to accommodate thermal elongation of the shaft. The rotor embodies the usual slidably mounted vanes 28. An intake port 29 is formed in the central body portion 23 and an outlet in the form of an L-shaped tube 30 which extends through the body portion and liner. A cover plate 31 seals the compressor chamber. The operation of this type of compressor is well understood in the art and need not be further described.

A piston head 32 is mounted in the upper end of the piston and serves as a support for the piston seal 33 which is in the form of a flanged rubber disk. The outlet tube 30 extends upwardly through the piston head and seal so that compressed air will be directed into the expansible chamber formed by the piston and cylinder, thus forcing the piston outwardly, which may be downwardly when the unit is mounted as shown in the drawings, or it may be in any other direction depending upon the orientation of the unit.

A spring 34 is disposed in the space between the lower piston wall and the cylinder and is confined between a ring nut 35, threaded into the lower edge of the cylinder and a suitable shoulder formed on the piston. Thus, the spring urges the piston inwardly to return it to normal retracted position when the compressor is not operating or when the air has been permitted to escape from the expansible chamber. The ring nut 35 provides tension adjustment for the spring.

Means are provided to regulate the throw, or displacement of the piston and also the working force and rate of displacement.

A hollow stem 36 extends upwardly from the piston head 32 and through cylinder head 42 and serves as a conduit for the motor leads 37. As shown in Fig. 11, a switch 38 is connected in series with the motor, the switch being mounted on the cylinder head 42. The switch is provided with a plunger 39 which is biased upwardly into normally closed circuit position, and is adapted to be depressed by a control lever 40 in order to open the motor circuit. The control lever 40 is pivotally mounted on a fulcrum plate 41 on the cylinder head 42. As viewed in Figs. 2 and 9, the right hand end of the control lever is biased downwardly by spring means 48. Thus, the control lever maintains the switch in open circuit position when the device is not in use.

A valve 43 is disposed in a bore formed in the cylinder head, the valve being biased into closed position by leaf spring 44. The upper end of the valve is adapted to be engaged by an adjusting screw 45 carried on the control lever. A knurled adjusting nut 46 is threaded onto the stem 36 and is maintained in adjusted position by a lock nut 47. Thus, as the piston is urged downwardly, the parts will move from the Fig. 2 position into the Fig. 9 position in which the adjusting nut 46 depresses the control lever into engagement with the valve 43 and the switch plunger 39. This causes the motor circuit to be opened and permits the air to escape from the cylinder with the result that the spring 34 returns the piston to its normal position. By adjusting the nut 46, the travel of the piston may be regulated. Electromagnet means, hereinafter described, maintain the control lever in its elevated position as shown in Fig. 2.

A bottom plate 49 closes the lower end of piston 13 and serves as a mounting for the armature shaft bearing 50. As shown in Fig. 1, a fan 51 is secured to the armature shaft for cooling the motor. The cylinder wall is provided with a slot 67 and perforations 68, and the bottom plate is perforated to permit air to flow through the motor windings according to standard practice.

The working force is controlled by means of a spring loaded valve which controls the air pressure in the cylinder. As shown in Figs. 1 and 6, a boss 52 is formed integrally with the cylinder head 42, and a port 53 is formed therein. A ball valve 54 is held by spring 55 against a shoulder formed in the port, and an adjusting screw 56 is provided to regulate the tension of the ball valve. A transverse bore 57 is provided for the escape of air from the regulating valve and a pressure gauge 58 is threaded into boss 52 and communicates with port 53 to assist the operator in regulating the adjusting screw 56. Thus, the air pressure in the cylinder may be regulated to secure any desired working force.

The rate of travel at which the piston and tool are advanced into the work is controlled by controlling the amount of air supplied to the compressor, as by choking the intake. As shown in Figs. 1, 7 and 8, a flanged tube 60 is threaded into the intake port 29. A cup 61 is suitably secured to the flange of the tube 60 to form a container in which are disposed a plurality of perforated felt disks 62 and an unperforated disk 63. These disks are saturated with oil so as to lubricate the compressor, the oil being picked up by the air as it passes through the felt disks. The disks also serve as an air filter.

The outer wall of the cup 61 is provided with an opening 64, and a control disk 65 is rotatably mounted on the outer wall and is provided with a series of openings 66 which are adapted to register with the opening 64. As shown in Fig. 7, these openings are of graduated size so as to regulate the volume of air supplied to the compressor 26.

It will be observed that it is the outermost disk 63 which is unperforated, and the other two disks serve as a reservoir to supply the oil to the unperforated disk. This arrangement permits a substantial volume of oil to be stored in the cup 61 without increasing the resistance to the flow of air to the extent to which it would be increased if the cup were solidly packed with felt.

An electromagnet 70 is connected in series with the motor 20, and the switch 38 which serves to maintain the control lever 40 in operated position, once the circuit is established through the motor. The circuit can be established by depressing the outer end of the control lever, which permits the switch plunger 39 to move upwardly into closed circuit position and which permits the valve 43 to close. Once the control lever is thus displaced against the bias of spring 48, the unit will automatically follow through its complete cycle of operation.

As an alternative, the cycle of operation may be instituted by providing a switch 71 externally of the unit which is shunted around the switch 38, that is, connected in parallel circuit therewith. This may be in the form of a foot switch, and it is necessary to maintain the switch 71 closed only until the electromagnet 70 is energized, since the energization thereof serves to close the circuit through switch 38. Where a plurality of power units are mounted on a single supporting means, such as a jig, for simultaneous operation, a single foot switch may be provided for all of the power units, or other suitable means can be provided for the common control of all units. In such an event it will be understood that the extent of travel, the working pressure, and the rate of advance may be individually controlled for each separate power unit.

The operation has been described in detail in connection with the description of the several parts. In summary, the unit may be mounted adjacent the work shown in Fig. 2 on any suitable supporting means. The extent of travel of the drill or other tool may be regulated by the nuts 46 and 47. The intake tube 60 extends outwardly through a slot 67 formed in the cylinder wall and serves to provide an outside limit beyond which the piston cannot be displaced.

Certain types of work may require a greater or lesser working force, and this may be regulated by the valve adjusting screw 56. The rate of piston advance is regulated by the control disk 65.

To initiate the operation, either the outer end of the control lever 40 may be depressed, or the switch 71 may be closed. Where it is desired to withdraw the drill or other tool prior to the completion of its movement as determined by the position of nut 46, one of the leads to the switch 38 may be disconnected, in which event the piston may be retracted by opening the switch 71.

If desired, the field of the motor 20 may be mounted on cylinder walls, and just the armature carried by the piston, although the construction illustrated is preferred since it utilizes standard motor windings.

Furthermore, the compressor, if desired, could be mounted in the head of the cylinder and be driven from the armature shaft through a splined connection. The position of stem 36 could be shifted in such a construction.

It is, of course, obvious that the unit could be actuated hydraulically rather than pneumatically, and the term "fluid" as used herein covers both a liquid and a gas. In the event of a hydraulically actuated unit, the compressor would serve as a pump.

The terms "downwardly," "upper," and "lower" as used herein are used in the relative sense only.

Although only a preferred embodiment of my invention is shown and described herein, it is obvious that various modifications and changes may be made in the construction shown without departing from the spirit of my invention as defined in the appended claims.

I claim:

1. A self-contained power unit for a tool such as a drill and designed for mounting in a fixed position above the work comprising a cylinder, a piston cooperating therewith to provide an expansible chamber, the lower end of said cylinder being open to the atmosphere, a motor carried by said piston and movable therewith, tool engaging means driven by said motor and projecting from the lower part of said piston, and means driven by said motor to supply a fluid to said chamber to force said piston downwardly so that a tool driven by said motor will be forced into engagement with the work.

2. A power unit as claimed in claim 1 in which said fluid supply means is carried by said piston.

3. A power unit as claimed in claim 1 in which said fluid supply means comprises a rotary vane compressor having a rotor coaxially mounted with respect to said motor and driven thereby.

4. A power unit as claimed in claim 1 in which said piston has an intermediate body portion, a motor shaft journalled in said body portion, an eccentricaly disposed cylindrical recess formed in said body portion, said fluid supply means comprising a rotary vane pump having a rotor disposed in said recess and secured to said motor shaft against relative rotation with respect thereto.

5. A power unit for a tool such as a drill comprising a cylinder, a piston cooperating therewith to provide an expansible chamber, a motor carried by said piston and movable therewith, tool engaging means driven by said motor and carried by said piston, means driven by said motor to supply a fluid to said chamber to force said piston downwardly so that a tool driven by said motor will be forced into engagement with the work, a valve communicating with said chamber, and means actuated by the displacement of said piston for opening said valve after said piston has been displaced through a predetermined distance in order to permit said fluid to escape from said chamber.

6. A power unit as claimed in claim 5 having means for biasing said piston into retracted position whereby said piston will be automatically returned to retracted position when said valve is opened.

7. A power unit as claimed in claim 6 in which said piston biasing means comprises a helical spring disposed between the lower portions of the walls of said piston and said cylinder.

8. A power unit as claimed in claim 5 in which said valve opening means comprises a control member for engaging said valve, and in which said power unit includes a switch for said motor having a portion which is adapted to be engaged by said control member as it moves into valve opening position to open the circuit through said switch.

9. A power unit as claimed in claim 5 in which said valve opening means comprises a pivotally mounted control member for engaging said valve, and in which said power unit includes a switch for said motor having a plunger which is adapted to be engaged by said control member as it moves into valve opening position to open the circuit through said switch, and in which said piston is provided with a stem having an adjustable member for engaging said control member.

10. A power unit as claimed in claim 5 having a switch in series circuit with said motor and in which said valve opening means opens said switch, and means for regulating the operation of said valve opening means with respect to the displacement of said piston.

11. A power unit as claimed in claim 10 having electromagnetic means in series circuit with said switch and motor for maintaining said valve opening means in position in which said switch and said valve are closed.

12. A power unit as claimed in claim 11 having a second switch connected in shunt relation with said first mentioned switch and in series circuit with said motor and said electromagnetic means to initially energize the latter.

13. A power unit for a tool such as a drill comprising a cylinder, a piston cooperating therewith to provide an expansible chamber, a motor carried by said piston and movable therewith, tool engaging means driven by said motor and projecting from the lower part of said piston, an air compressor driven by said motor to supply air to said chamber to urge said piston downwardly so that a tool driven by said motor will be urged into engagement with the work, and means to regulate the pressure of the air in said chamber.

14. A power unit as claimed in claim 13 in which said air compressor includes intake means and means for choking the air flowing through said intake means to regulate the rate at which said piston is urged downwardly.

15. A power unit comprising a cylinder, a piston for said cylinder and cooperating therewith to form an expansible chamber, a shaft journaled in said piston, means disposed in said piston for rotating said shaft, a tool chuck driven by said shaft, means for supplying air to said chamber to urge said piston outwardly in said cylinder, a stem carried by said piston and extending through the head of said cylinder, an adjustable nut carried by said stem, and means adapted to be engaged by said nut as said piston is urged outwardly for releasing the air confined within said cylinder and for rendering said shaft rotating means inoperative.

16. A power unit as claimed in claim 15 having means to regulate the air pressure in said chamber.

17. A power unit as claimed in claim 16 in which said pressure regulating means includes a spring loaded valve disposed in communication with said chamber.

18. A power unit as claimed in claim 15 having means to regulate the volume of air supplied to said chamber in order that the rate of speed at which said piston moves outwardly can be controlled.

19. A power unit comprising a cylinder, a piston for said cylinder, a shaft journaled in said piston, means disposed in said piston for rotating said shaft, a tool chuck driven by said shaft, a rotary vane compressor disposed in said piston and driven by said shaft, conduit means leading from said compressor to the space between said piston and the head of said cylinder in order that the air compressed by said compressor may urge said piston outwardly in said cylinder, means to regulate the pressure of the air in said cylinder, means to regulate the volume of air supplied to said compressor in order that the rate at which said piston is urged outwardly may be controlled, a stem carried by said piston and extending through the head of said cylinder, an adjustable nut carried by said stem, and means adapted to be engaged by said nut as said piston is urged outwardly for releasing the air confined within said cylinder and for rendering said shaft rotating means inoperative.

20. A self-contained drill unit comprising a drill spindle, a pneumatic feed therefor comprising a cylinder, a piston, and a compressor, a common electric motor for driving said spindle and said compressor whereby the drill spindle speed is a function of the spindle thrust due to the load imposed on the motor by both the drilling torque and the drill thrust, means to regulate the drill speed comprising pressure regulating means for regulating the air pressure within said cylinder, and means to regulate the feed rate comprising an adjustable intake choke for said compressor, said motor and compressor being coaxially mounted on said piston, and said drill spindle constituting an extension of the armature shaft of said motor to provide a self-contained, gearless unit.

JAMES P. STEIBEL.

References Cited in the file of this patent

UNITED STATES PATENTS

| Number | Name | Date |
|---|---|---|
| 1,434,564 | Ruetschi | Nov. 7, 1922 |
| 1,998,873 | Kingsbury | Apr. 23, 1935 |
| 2,196,208 | Gardner | Apr. 9, 1940 |
| 2,308,731 | White | Jan. 19, 1943 |
| 2,488,992 | Taylor | Nov. 22, 1949 |